US006824149B1

(12) United States Patent
Whitlock et al.

(10) Patent No.: US 6,824,149 B1
(45) Date of Patent: Nov. 30, 2004

(54) MULTIPURPOSE ADJUSTABLE MECHANIC SUPPORT AND CREEPER ASSEMBLY

(76) Inventors: Murray C. Whitlock, 1634 Bass Hwy, Grantville, Vic 3984 (AU); Ivan J. Kuljis, 36 S Gippsland Hwy, Tooradin, Vic 3980 (AU)

( * ) Notice: Subject to any disclaimer, the term of this patent is extended or adjusted under 35 U.S.C. 154(b) by 0 days.

(21) Appl. No.: 10/286,739

(22) Filed: Nov. 1, 2002

(51) Int. Cl.[7] ................................................ B62B 11/00

(52) U.S. Cl. .................... 280/32.6; 280/47.35; 297/118

(58) Field of Search ............................... 280/32.6, 32.5, 280/30, 640, 643, 648, 651, 87.05, 79.2, 47.18, 47.35, 47.41; 297/118

(56) References Cited

U.S. PATENT DOCUMENTS

| | | | | | |
|---|---|---|---|---|---|
| 4,397,374 | A | | 8/1983 | Rumage et al. | |
| 4,632,410 | A | * | 12/1986 | Bainbridge et al. | 280/32.5 |
| 4,727,958 | A | | 3/1988 | Botello | |
| 4,863,178 | A | * | 9/1989 | Friesen | 280/32.6 |
| 4,867,273 | A | * | 9/1989 | Schaevitz | 182/116 |
| 5,072,955 | A | | 12/1991 | Holland et al. | |
| 5,116,264 | A | | 5/1992 | Wiederrich et al. | |
| 5,129,678 | A | * | 7/1992 | Gurbacki | 280/770 |
| 5,351,983 | A | * | 10/1994 | Descalo | 280/646 |
| 5,451,068 | A | * | 9/1995 | Shockley | 280/32.6 |
| 5,460,392 | A | | 10/1995 | Hansen | |
| 5,494,305 | A | * | 2/1996 | Chen | 280/32.6 |
| 5,707,067 | A | * | 1/1998 | Smith | 280/32.6 |
| RE35,732 | E | * | 2/1998 | Shockley | 280/32.6 |
| 5,897,122 | A | * | 4/1999 | Borner | 280/32.6 |
| 6,095,532 | A | | 8/2000 | Martin | |
| 6,105,719 | A | | 8/2000 | Lensing | |
| D431,705 | S | * | 10/2000 | Yuan | 280/32.6 |
| 6,199,877 | B1 | | 3/2001 | Shockley | |
| 6,240,856 | B1 | | 6/2001 | Paskey et al. | |
| RE37,372 | E | | 9/2001 | Smith | |
| D453,601 | S | | 2/2002 | Ji | |
| 6,345,828 | B1 | | 2/2002 | Pool et al. | |
| 6,425,590 | B1 | * | 7/2002 | Whiteside et al. | 280/32.6 |
| 6,578,857 | B1 | * | 6/2003 | Whiteside et al. | 280/32.6 |
| 6,595,590 | B2 | * | 7/2003 | Bottoms | 297/423.11 |
| 6,641,146 | B2 | * | 11/2003 | Reese | 280/32.6 |

* cited by examiner

*Primary Examiner*—Bryan Fischmann
*Assistant Examiner*—Jeff Restifo

(57) ABSTRACT

A multipurpose adjustable mechanic support and creeper assembly provides an adjustable device that can be used to support the body while working with variously sized vehicles, compactly stored, and converted into a mechanic's creeper. The device includes a base frame and a pair of support assemblies each having a support member. A height adjustable tool support, expandable leg portions to broaden the base frame, and storage areas are also provided. The support members are removable and securable to each other to form a creeper or a seat.

18 Claims, 8 Drawing Sheets

MULTIPURPOSE ADJUSTABLE MECHANIC SUPPORT AND CREEPER ASSEMBLY

BACKGROUND OF THE INVENTION

1. Field of the Invention

The present invention relates to body supports and creepers and more particularly pertains to a new multipurpose adjustable mechanic support and creeper assembly for providing an adjustable device that can be used to support the body while working variously sized vehicles, compactly stored, and converted into a mechanic's creeper.

2. Description of the Prior Art

The use of body supports and creepers is known in the prior art. U.S. Pat. No. 4,727,958 issued to Botello describes a body support device for a mechanic that can be adjusted to set the height of a single body supporting pad and knee pads to a comfortable position to support the entire body of a mechanic during work. Another type of body support is U.S. Pat. No. 5,072,955 issued to Holland et al. disclosing a number of steps and a removable tool tray. U.S. Pat. No. 5,460,392 issued to Hansen discloses a height adjustable creeper with an extendable tray. U.S. Pat. No. 6,105,719 issued to Lensing discloses a ladder type structure having a padded upper support portion. U.S. Pat. No. 4,397,374 issued to Rumage et al. discloses a body supporting apparatus having two support portions that are adjustable relative to each other. U.S. Pat. No. 5,116,264 issued to Wiederrich et al. discloses a positionable bench assembly utilizing a crank and pulley system. U.S. Pat. No. 6,240,856 issued to Paskey et al. discloses a height adjustable vehicle tool tray. U.S. Pat. No. 6,199,877 issued to Shockley discloses a transformable creeper that adjusts between a two level seat and a substantially planar body support. U.S. Pat. No. 6,095,532 issued to Martin discloses a folding creeper that adjusts between a single level creeper and a raised support surface for tools and the like. U.S. Pat. No. 6,345,828 issued to Pool et al. discloses a molded plastic creeper structure. U.S. Reissued Pat. No. RE37,372 discloses a device adjustable between a creeper, a seat, and a platform. U.S. Pat. No. Des. 453,601 shows an ornamental design for a combination creeper and seat.

While these devices fulfill their respective, particular objectives and requirements, the need remains for a device that provides an adjustable base width, multiple torso supporting cushions, a tool tray positionable to be accessible from a selectable side of the device, an adjustable seat/creeper, and compact storing.

SUMMARY OF THE INVENTION

The present invention meets the needs presented above by addressing the following objectives.

An object of the present invention is to provide a new multipurpose adjustable mechanic support and creeper assembly that has an adjustable base width.

Even still another object of the present invention is to provide a new multipurpose adjustable mechanic support and creeper assembly that provides multiple support pads that are adjustable into several positions with and without a main frame assembly such that the support pads can support a person on the main frame or work separately as a creeper or work bench.

To this end, the present invention generally comprises a base frame and a pair of support assemblies each having a support member. A height adjustable tool support, expandable leg portions to broaden the base frame, and storage areas are also provided. The support members are removable and securable to each other to form a creeper.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
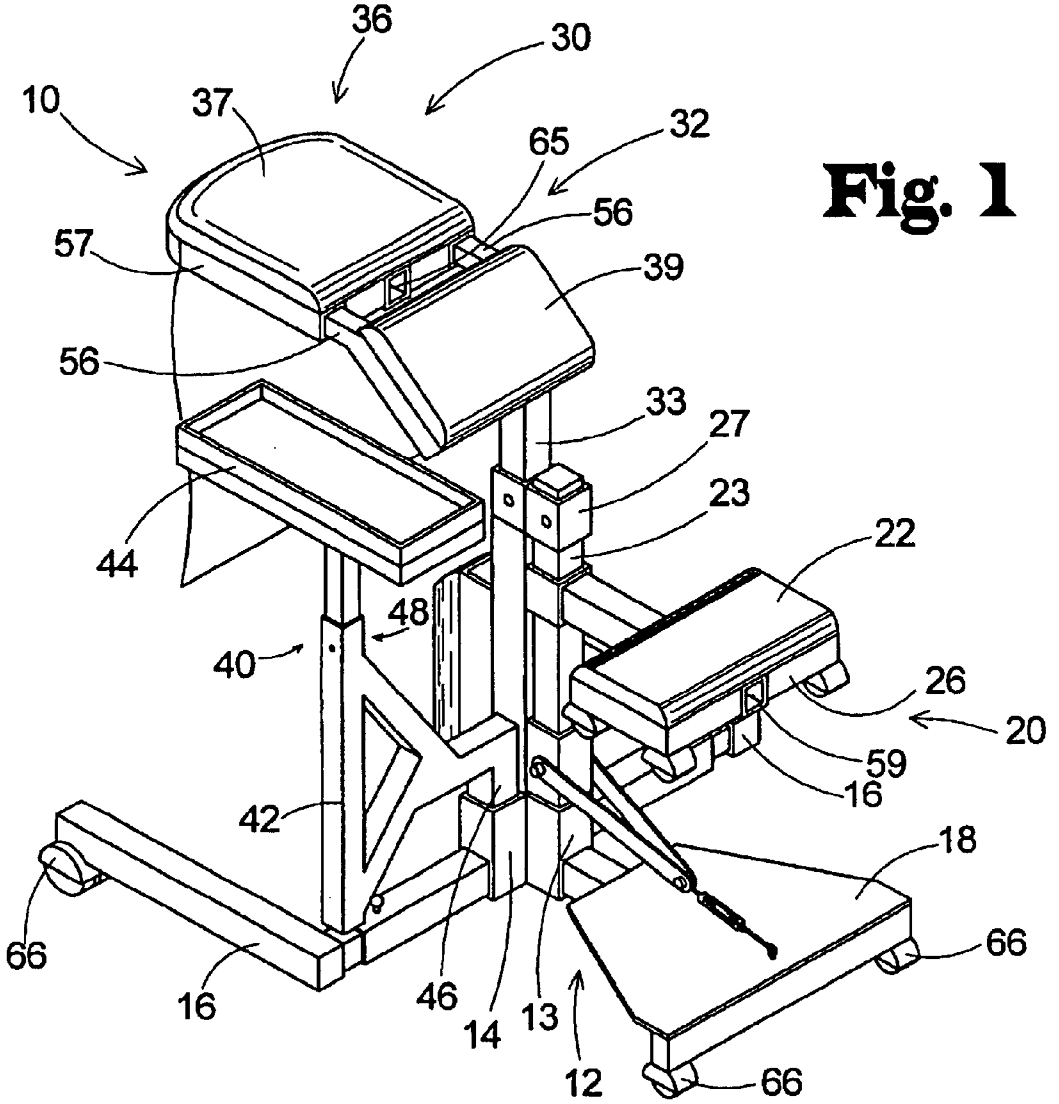
FIG. 1 is a perspective view of a new multipurpose adjustable mechanic support and creeper assembly according to the present invention.
Figure 2:
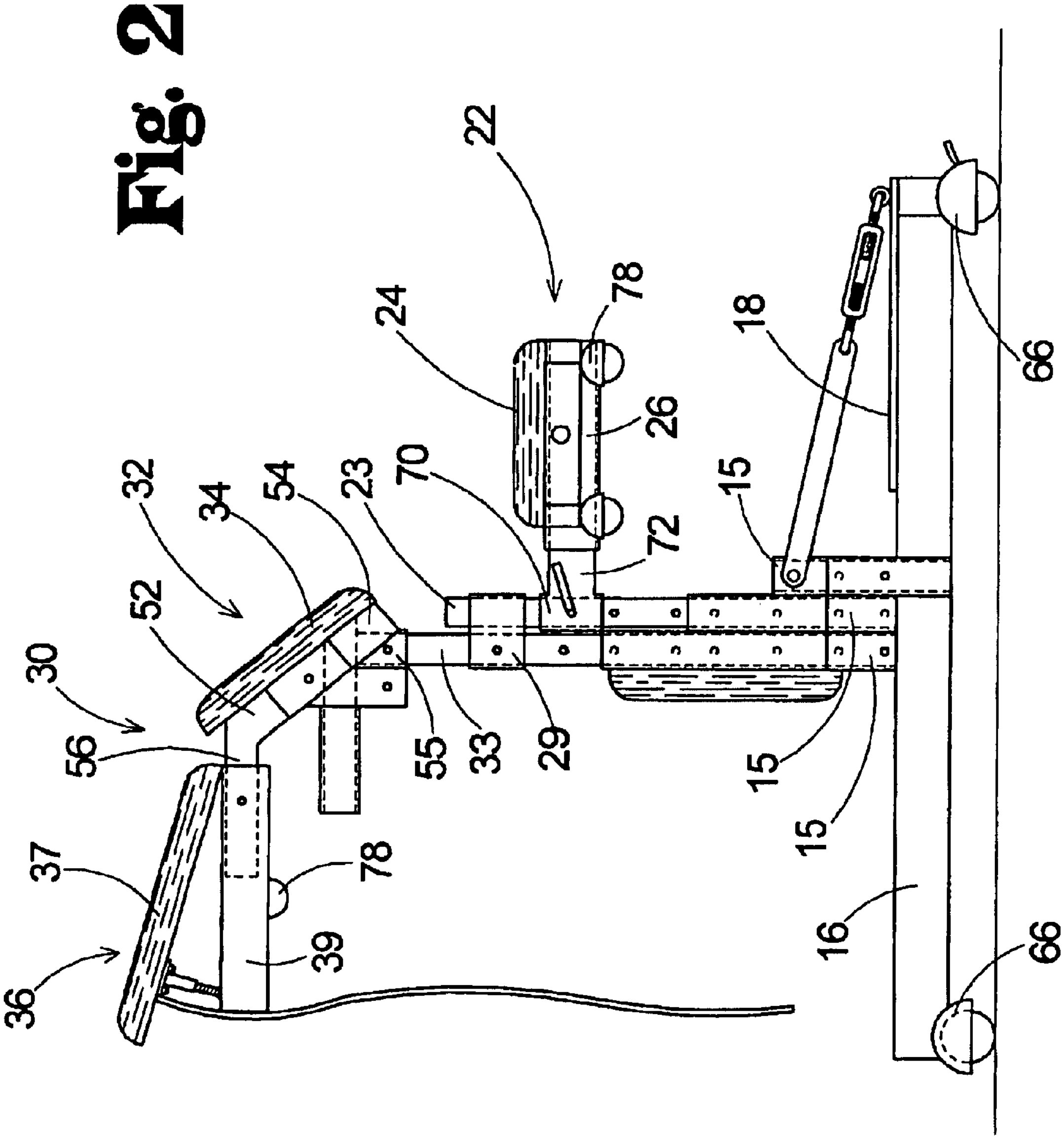
FIG. 2 is a side view of the present invention.
Figure 3:
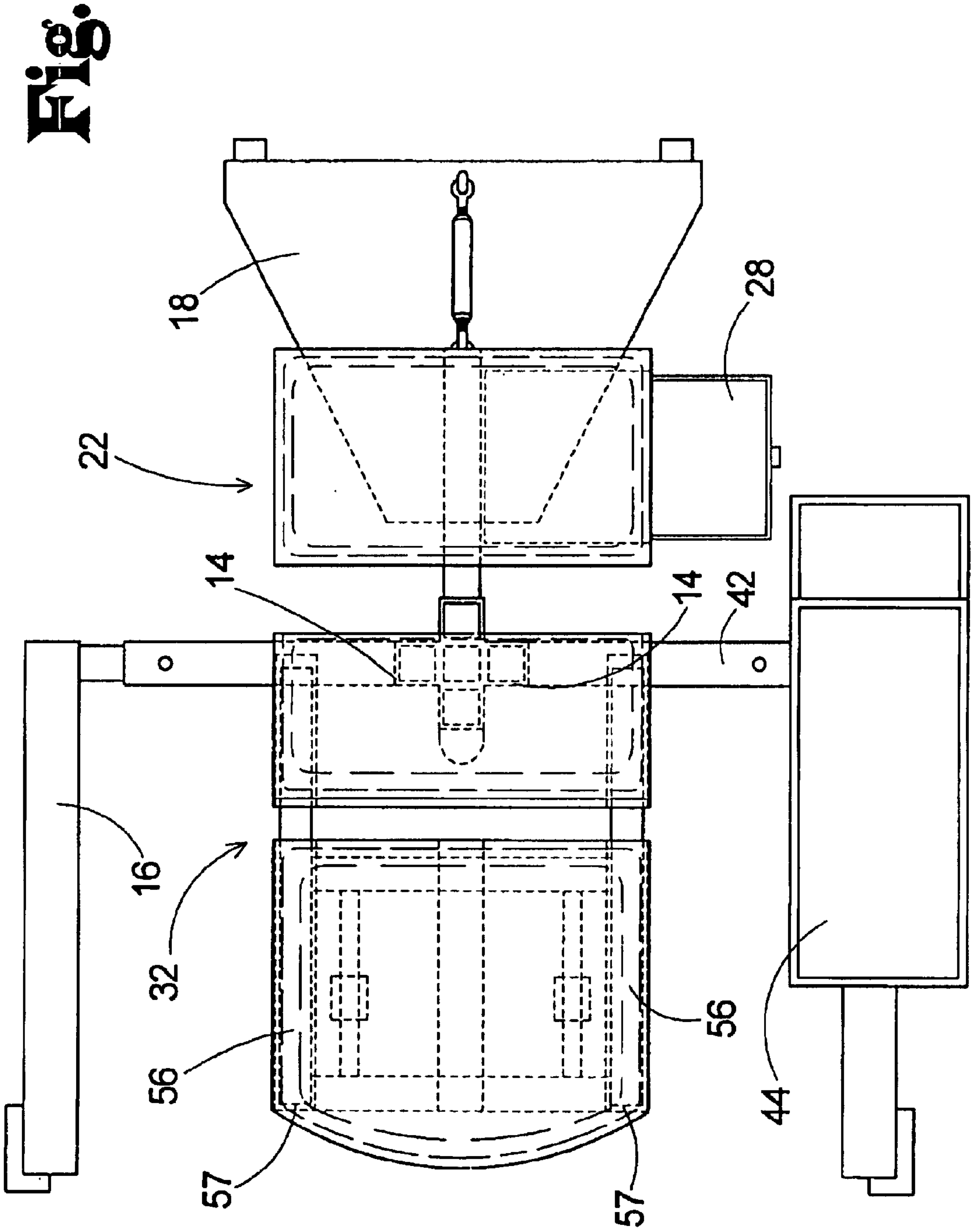
FIG. 3 is a top view of the present invention.
Figure 4:
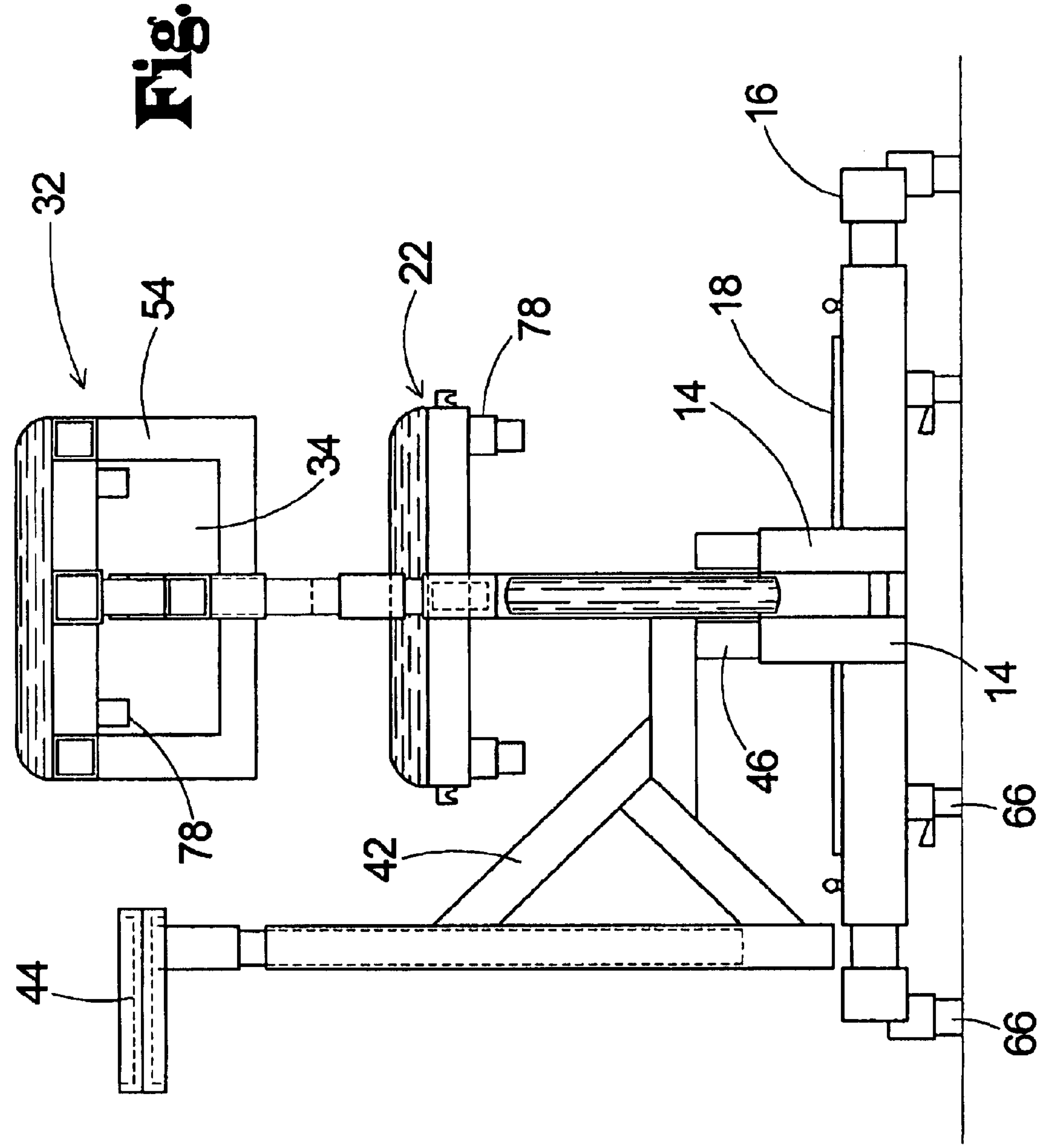
FIG. 4 is a front view of the present invention.
Figure 5:
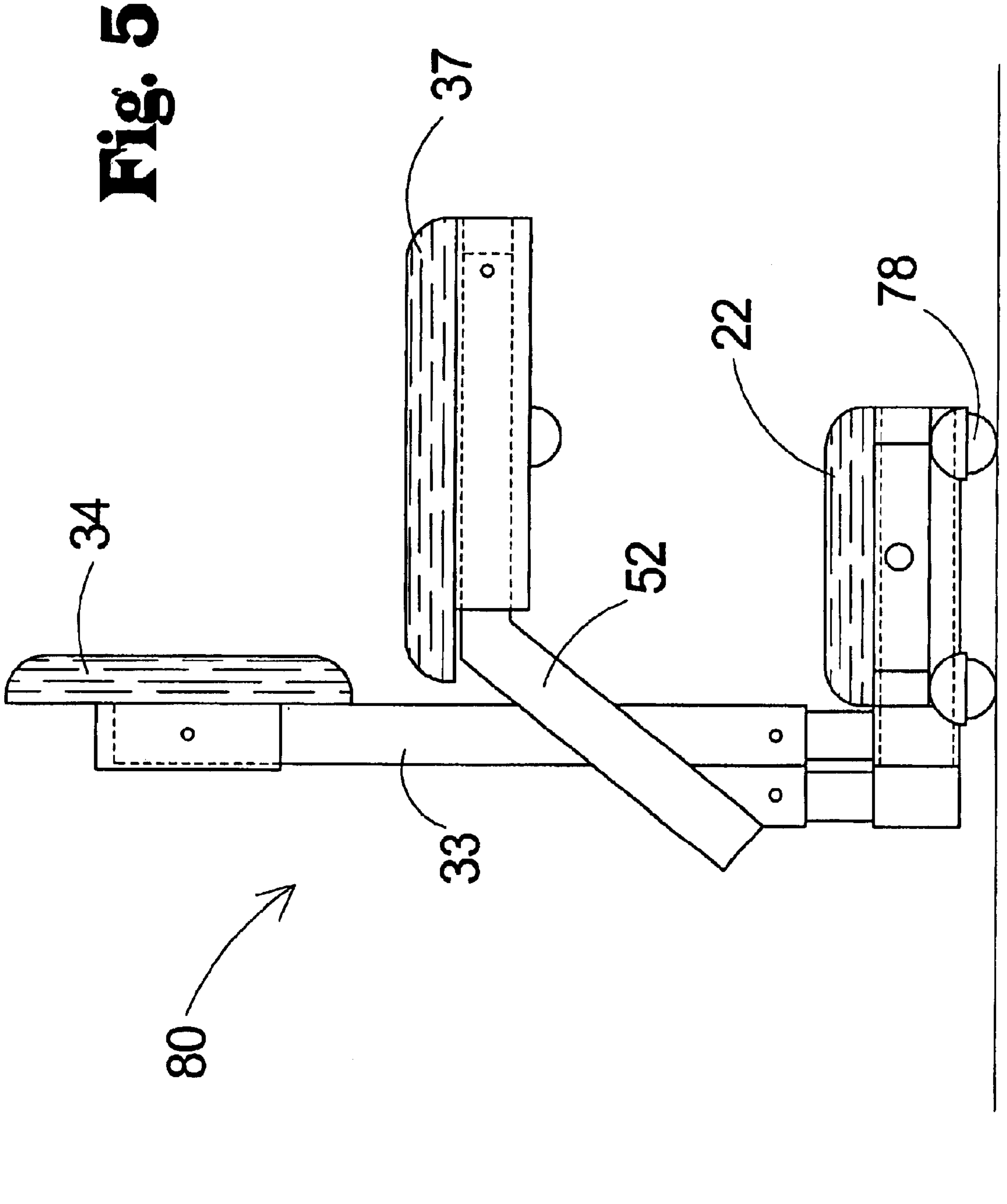
FIG. 5 is a side view of the present invention in a seat assembly configuration.
Figure 6:
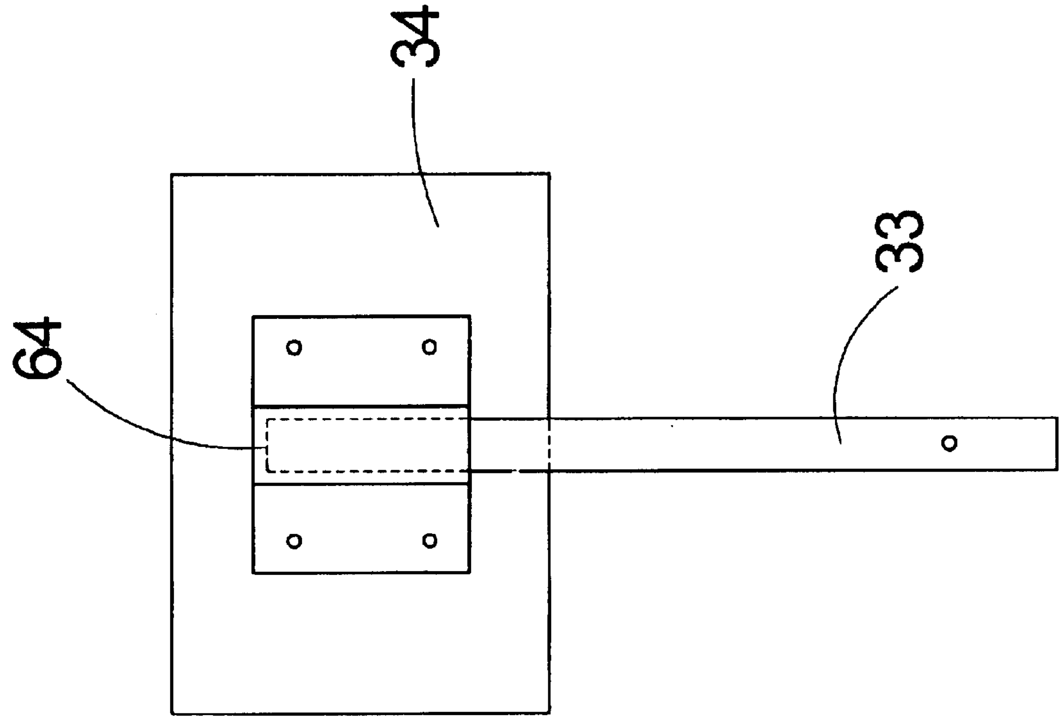
FIG. 6 is a back view of the backrest portion of the seat assembly configuration of the present invention.
Figure 7:
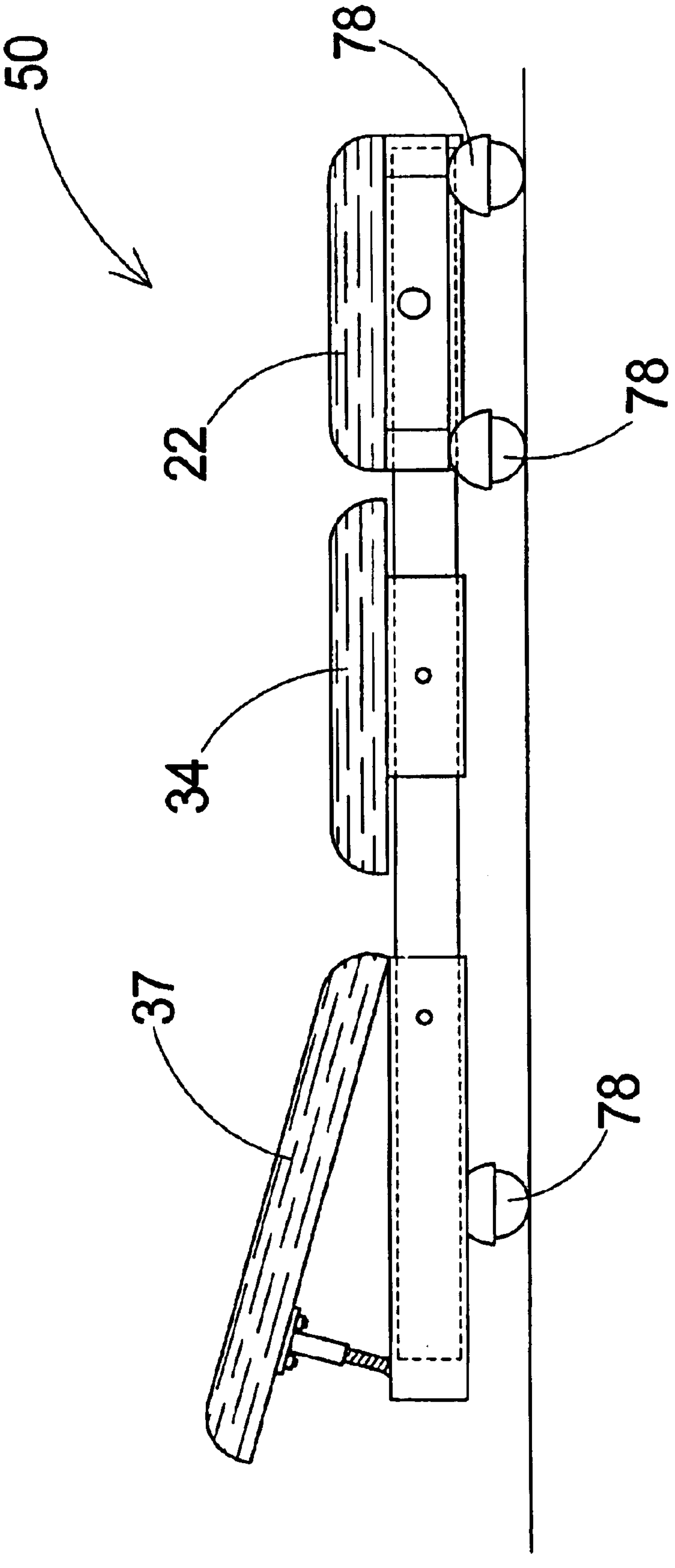
FIG. 7 is a side view of the present invention in a creeper assembly configuration.
Figure 8:
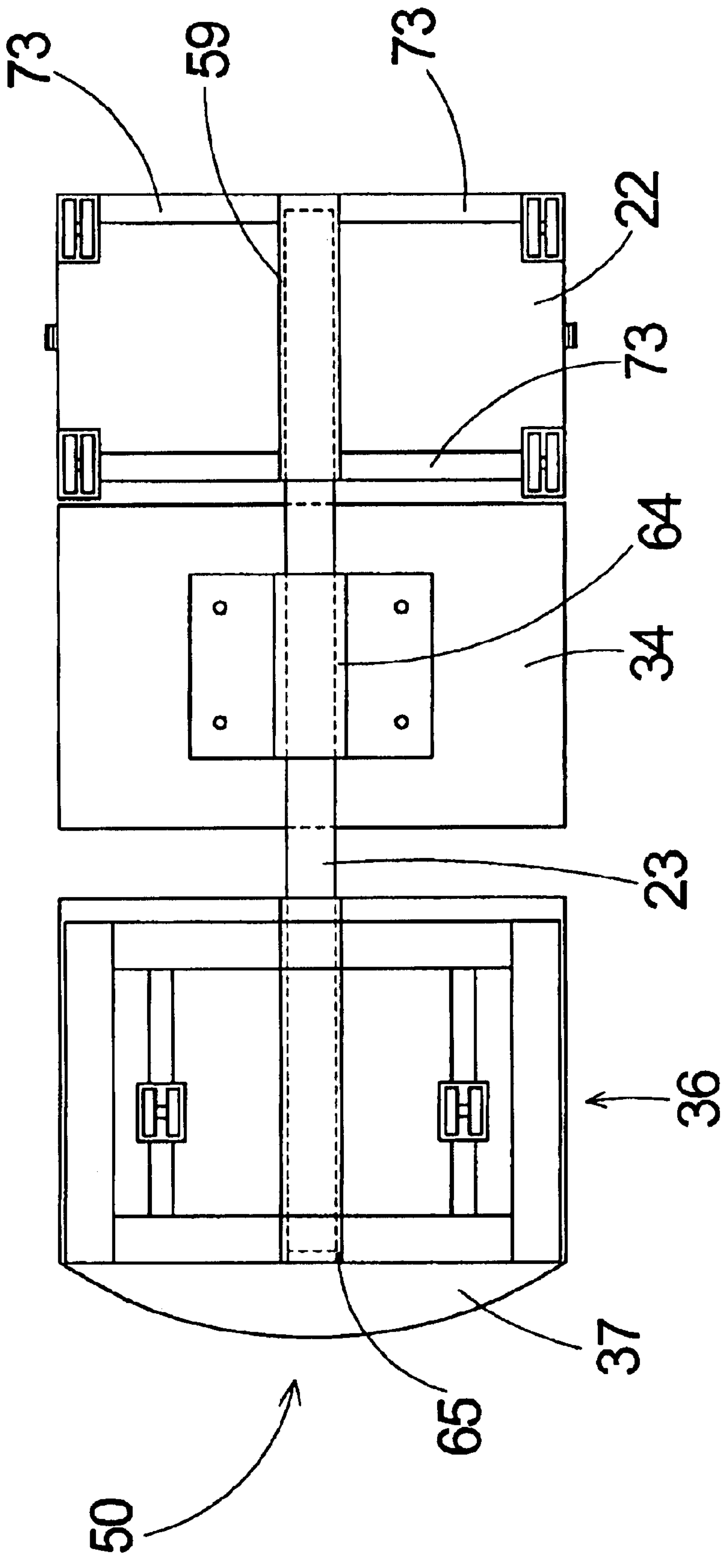
FIG. 8 is a bottom view of the creeper assembly configuration of the present invention.

With reference now to the drawings, and in particular to FIGS. 1 through 8 thereof, a new multipurpose adjustable mechanic support and creeper assembly embodying the principles and concepts of the present invention and generally designated by the reference numeral 10 will be described.

As best illustrated in FIGS. 1 through 8, the multipurpose adjustable mechanic support and creeper assembly 10 comprises a generally H-shaped tubular base frame 12 and a base support assembly 13. The base support assembly comprises three tubular posts fixedly attached to each other. The posts are aligned and descend in height from a front of the base frame to a back of the base frame. The posts are pivotally coupled to the base frame such that the base support assembly is pivotable between a storage position and a use position in which the posts are substantially vertical. A securing means is provided to hold the posts in an upright position during use.

A first support assembly 20 is coupled to the base support assembly 13 by insertion of an elongated member 23 into one of the posts 15. The first support assembly 20 has a first assembly support member 22 coupled to the elongated member 23. A second support assembly 30 is also coupled to the base support assembly 13 using an elongated member 33. The second support assembly 30 has a second assembly support member 32 couplable to the elongated member 33.

The elongated support members are coupled together and supported by a two sleeved collar 29.

The first support assembly 20 is adjustable for positioning the first assembly support member 22 at a desired height above the base frame. Similarly, the second support assembly 30 is also adjustable for positioning the second assembly support member 32 at a desired height relative to the first assembly support member 22. The first and second support assemblies form a telescoping arrangements and locking members are insertable through the posts to lock the telescoping parts in a static position for use. Thus, the first and second assembly support members 22 and 32 are positionable to support lower and upper parts of the user in a bent over position to facilitate suspending the user over a vehicle in a comfortable working position.

The base frame 12 has a pair of extendable L-shaped leg portions 16 secured by spring pins or a similar locking mechanism. The leg portions 16 are telescopically extendable outwardly to broaden the base frame 12 and another spring pin or similar device is used to prevent accidental separation of each leg portion from the main portion of the base frame. Base wheel means 66 are coupled to the base frame 12 for facilitating positioning of the base frame 12. The base wheel means are also lockable to prevent unintended movement of the base frame during use. A deck plate 18 is coupled to the base frame 12 to permit a user to remove the first support assembly from the base frame 12 and be supported directly on the base frame 12 if desired.

A tool support assembly 40 is provided. The tool support assembly has an extension portion 42 and a substantially horizontal planar portion 44. The tool support assembly 40 is couplable to the base frame 12 using a selectable one of a pair of tool support connection collars 14. Each of the tool support connection collars 14 is positioned on a respective side of the base frame 12. Each of the tool support connection collars 14 is designed for receiving a connection portion 46 of the tool support assembly 40. Selection of which collar 14 is used determines which side of the base frame 12 the planar portion 44 is positioned on. Thus, the user may choose on which side a tool box is positioned while working. A tool support adjustment means 48 is provided for adjusting a height of the planar portion 44 of the tool support assembly 40 relative to the base frame 12. Thus, a tool box can be supported at a desired height relative to the base frame 12 and the first and second assembly support members 22 and 32. Typically, the posts of the base support assembly 13 are aligned with a middle of the base frame 12 and the collars 14 are coupled on each side of the posts. A turnbuckle assembly is couplable to extend between the base frame 12 and a rearmost one of the posts of the base support assembly to stabilize the base support assembly during use.

The first assembly support member 22 is attached to the elongated member 23 using a collar 70 having a connection arm 72. The connection arm 72 is attachable to the first assembly support member 22 by sliding a tubular receiver 59 connected to a bottom of the support member 22 over the connection arm 72. The tubular receiver 59 is slidable over the connection arm 72 and a suitable locking pin or locking screw is used to permit securable horizontal adjustment of the first assembly support member 22. Cross members 73 extend orthogonally to the receiver 59 to support and strengthen the first assembly support member. One of the cross members 73 is offset from an edge of the support member 22 to permit placement of the locking pin or screw adjacent to the edge of the support member 22 to facilitate use of the locking pin or screw.

The support member 22 has a pad 24 hingably coupled to a bottom portion 26. The bottom portion 26 has a relatively hard flat upper surface 27 that is exposable to permit standing on the hard flat surface. When desired for supporting parts of the user such as the shins or knees, the pad is positionable over the hard flat upper surface. A drawer 28 is slidably coupled to the bottom portion 26 of the first assembly support member 22. The drawer 28 can be moved in and out from the bottom portion and used to store tools.

The planar portion 44 is slidably coupled to the extension portion 42 of the tool support assembly 40. Typically, the extension portion 42 has a pair of spaced guides or tubular bars and the planar portion has a pair of rails that receive the guides or bars. Thus, the planar portion is slidable relative to the extension portion.

The second assembly support member 32 has a frame 52, a first pad portion 34, and a second pad portion 36. The frame 52 has a generally rectangular portion 54 and a pair of protruding arms 56 that extend from the rectangular portion at approximately a 45 degree angle from the plane in which the rectangular portion 54 lies. The frame 52 is coupled to the elongated member 33 using a collar 55 attached to the frame 52. The collar 55 is attached to extend orthogonally relative to the arms 56: The first pad portion 34 is attachable to the rectangular portion 54 using brackets and fastening members positioned to engage outer or inner portions of the rectangular portion 54. Again, locking pins or screws are used to facilitate removal of the pad portion 34 from the frame 52. The second pad portion 36 is attachable to the arms 56 using two sleeves 57 attached to a bottom of the pad portion 36. The sleeves 57 slide over the protruding arms 56. Suitable means are provided to prevent the pad portion 36 from sliding out too far. Typically, the arms 56 are of such a length that the pad portion 36 is stable when extended out to but not past the leg extensions coupled to the base frame 12.

The pad portion 36 has a hinged upper portion 37 that can be propped up relative to a bottom portion 39 of the pad portion 36. A pivoted support arm is provided to extend down and engage a slot or other depression to hold the upper portion 37 in a stable propped position if desired.

The first assembly support member 22 and the second assembly support member 32 are each removable from the first and second support assemblies 20 and 30. Wheel means 78 are coupled to the first assembly support member 22 and the second assembly support member 32. The first assembly support member 22 is securable to the second assembly support member 32 to form a creeper assembly 50. To form the creeper assembly 50, the pad portion 36 is positioned at one end and either elongated member 23 or 33 is inserted into a centrally positioned tubular receiver 65 on the bottom of the pad portion 36. A tubular receiver 64 coupled to pad portion 34 is slid over the elongated member 23 or 33 and first support member 22 is attached to the elongated member 23 or 33 to position pad portion 34 between pad portion 36 and first support member 22. The upper portion 37 of pad portion 36 is positionable at an upward angle to support the head or upper back area of the user in an inclined position if desired.

To form a chair assembly 80, first support member 22 is positioned on the ground and elongated member 23 or 33 is inserted into and secured to coller 13 such that the elongated member 23 or 33 extends up from the first support member 22. Pad portion 34 is removed from frame 52 and collar 55 is attached and secured to elongated memeber 23 or 33 at a desired height. Pad portion 36 is attached to the frame 52 as described above to form a seat portion of the chair assembly. Pad portion 34 is then securable to the elongated memeber 23 or 33 at a height above pad portion 36 to form a back portion of chair assembly 80.

Each of the parts is removable from the base frame, including the L-shaped extension legs. Thus, the entire device is collapsible into a compact unit to facilitate storage.

A draping sheet is couplable to the second assembly support member 32 such that the sheet is positioned between a vehicle being worked on and mechanic support and creeper assembly 10. Thus, the sheet prevents marring or damaging of the vehicle during use. In an embodiment, the sheet is attached using hook and loop fastener to permit easy removal or replacement of the sheet.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A multipurpose adjustable mechanic support and creeper assembly comprising:

a base frame;

a first support assembly having a first assembly support member for supporting a user, said first support assembly being coupled to said base frame;

a second support assembly having a second assembly support member, said second support assembly being coupled to said base frame;

said first support assembly being adjustable for positioning said first assembly support member at a desired height above said base frame;

said second support assembly being adjustable for positioning said second assembly support member at a desired height relative to said first assembly support member;

wheel means coupled to said first assembly support member and said second assembly support member;

wherein said first assembly support member and said second assembly support member are each removable from said first and second support assemblies; and said first assembly support member being securable to said second assembly support member to form a creeper assembly.

2. The multipurpose adjustable mechanic support and creeper assembly of claim 1, further comprising:

a tool support assembly, said tool support assembly having an extension portion and a substantially horizontal planar portion, said tool support assembly being couplable to said base frame.

3. The multipurpose adjustable mechanic support and creeper assembly of claim 2 further comprising:

a tool support adjustment means for adjusting a height of said planar portion of said tool support assembly relative to said base frame.

4. The multipurpose adjustable mechanic support and creeper assembly of claim 3 wherein said planar portion is slidably coupled to said extension portion of said tool support assembly.

5. The multipurpose adjustable mechanic support and creeper assembly of claim 2, further comprising:

a pair of tool support connection collars, each of said tool support connection collars being positioned on respective sides of said base frame, each of said tool support connection collars being for receiving a connection portion of said tool support assembly whereby said tool support assembly is positionable on a selectable side of said base frame.

6. The multipurpose adjustable mechanic support and creeper assembly of claim 5 wherein said first and second support assemblies are aligned with a middle of said base frame.

7. The multipurpose adjustable mechanic support and creeper assembly of claim 1 further comprising:

said first assembly support member having a pad hingably coupled to a bottom portion.

8. The multipurpose adjustable mechanic support and creeper assembly of claim 7, further comprising:

drawer slidably coupled to said bottom portion of said first assembly support member.

9. The multipurpose adjustable mechanic support and creeper assembly of claim 1 wherein said first assembly support member is removable from said first support assembly.

10. The multipurpose adjustable mechanic support and creeper assembly of claim 1, further comprising:

said base frame having a pair of extendable leg portions, said leg portions being extendable outwardly to broaden said base frame.

11. The multipurpose adjustable mechanic support and creeper assembly of claim 1, further comprising:

said second assembly support member having a frame, a first pad portion and a second pad portion;

said frame having a first portion and a pair of protruding arms extending from said first portion at an angle from a plane in which said first portion lies;

said first pad portion being coupled to said first portion of said frame; and said second pad portion being slidably coupled to said protruding arms.

12. The multipurpose adjustable mechanic support and creeper assembly of claim 11 further comprising:

an elongated member being attachable to said first support member such that said first support member extends upwardly from said first support member;

said first pad portion being removable from said frame;

said frame being attachable to said elongated member to hold said second pad portion in a position over said first support member to form a seat.

13. The multipurpose adjustable mechanic support and creeper assembly of claim 12 further comprising:

said first pad portion being securable to said elongated member to form a backrest.

14. The multipurpose adjustable mechanic support and creeper assembly of claim 1, further comprising:

said second assembly support member having a first pad portion and a second pad portion;

said first pad portion, second pad portion, and said first support member each having a respective tubular receiver;

said tubular receivers being alignable;

an elongated member insertable through and securable to said aligned tubular receivers whereby said first pad portion, second pad portion, and said first support member form said creeper assembly.

15. The multipurpose adjustable mechanic support and creeper assembly of claim 1, further comprising:

base wheel means coupled to said base frame for facilitating positioning of said base frame.

16. The multipurpose adjustable mechanic support and creeper assembly of claim 1 further comprising:

a deck plate coupled to said base frame.

17. The multipurpose adjustable mechanic support and creeper assembly of claim 1, further comprising:

a draping sheet couplable to said second assembly support member.

18. A multipurpose adjustable mechanic support and creeper assembly comprising:

a base frame;

a first support assembly having a first assembly support member for supporting a user, said first support assembly being coupled to said base frame;

a second support assembly having a second assembly support member, said second support assembly being coupled to said base frame;

said first support assembly being adjustable for positioning said first assembly support member at a desired height above said base frame;

said second support assembly being adjustable for positioning said second assembly support member at a desired height relative to said first assembly support member;

said second assembly support member having a frame, a first pad portion and a second pad portion;

said frame having a first portion and a pair of protruding arms extending from said first portion at an angle from a plane in which said first portion lies;

said first pad portion being coupled to said first portion of said frame; and said second pad portion being slidably coupled to said protruding arms.

* * * * *